US011060882B2

(12) United States Patent
Di Pietro et al.

(10) Patent No.: US 11,060,882 B2
(45) Date of Patent: Jul. 13, 2021

(54) TRAVEL DATA COLLECTION AND PUBLICATION

(71) Applicant: Zoox, Inc., Foster City, CA (US)

(72) Inventors: Adriano Di Pietro, San Carlos, CA (US); James William Vaisey Philbin, Palo Alto, CA (US); Gabriel Thurston Sibley, Menlo Park, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 16/434,679

(22) Filed: Jun. 7, 2019

(65) Prior Publication Data

US 2019/0353500 A1 Nov. 21, 2019

Related U.S. Application Data

(63) Continuation of application No. 15/473,996, filed on Mar. 30, 2017, now Pat. No. 10,317,240.

(51) Int. Cl.
*G01C 21/36* (2006.01)
*G06N 20/00* (2019.01)
*G01C 21/32* (2006.01)

(52) U.S. Cl.
CPC ......... *G01C 21/3694* (2013.01); *G01C 21/32* (2013.01); *G01C 21/3679* (2013.01); *G06N 20/00* (2019.01)

(58) Field of Classification Search
None
See application file for complete search history.

(56) References Cited

U.S. PATENT DOCUMENTS

| 6,516,267 B1* | 2/2003 | Cherveny | G01C 21/26 |
| | | | 123/399 |
| 8,694,241 B1* | 4/2014 | Kadous | G08G 1/0141 |
| | | | 701/412 |
| 9,566,986 B1 | 2/2017 | Gordon et al. | |
| 9,940,834 B1 | 4/2018 | Konrardy et al. | |
| 2008/0042825 A1 | 2/2008 | Denny et al. | |
| 2008/0071465 A1 | 3/2008 | Chapman et al. | |
| 2011/0137895 A1 | 6/2011 | Petrou et al. | |

(Continued)

OTHER PUBLICATIONS retrieved on Feb. 3, 2017 at <<https://www.google.com/maps>>; Google; 1 page.

(Continued)

*Primary Examiner* — Tamara L Weber
(74) *Attorney, Agent, or Firm* — Lee & Hayes, P.C.

(57) ABSTRACT

Travel data may be gathered and published on a global map for use by various entities. The travel data may be captured by one or more vehicle computing devices, such as those associated with the operation and/or control of a vehicle. The vehicle computing devices may receive input from one or more sensors, and may identify and/or classify an event and/or areas of interest based on the input. The vehicle computing devices may then send travel data to the global map server for publication. Additionally or alternatively, the travel data may be captured by one or more user devices. The user devices may be configured to receive travel data, such as via a user interface, and to send the travel data to the global map server for publication. The global map server may consolidate and publish the travel data on a global map.

20 Claims, 7 Drawing Sheets

(56) References Cited

U.S. PATENT DOCUMENTS

| | | |
|---|---|---|
| 2016/0357188 A1 | 12/2016 | Ansari |
| 2016/0379486 A1 | 12/2016 | Taylor |
| 2017/0169625 A1 | 6/2017 | Lavie et al. |
| 2017/0186315 A1* | 6/2017 | Glasgow ............ G01C 21/3691 |
| 2018/0135989 A1* | 5/2018 | Schreier ................. H04W 4/44 |
| 2018/0188037 A1* | 7/2018 | Wheeler ................. G06K 9/03 |

OTHER PUBLICATIONS

Lipson et al., Driverless: Intelligent Cars and the Road Ahead, 2016, MIT Press, p. 7-8, 1 0-11 , 141 , 185 and 187 (Year: 2016).
Office Action for U.S. Appl. No. 15/473,996, dated May 17, 2018, Di Pietro et al, "Travel Data Collection and Publication" 29 pages.
Office Action for U.S. Appl. No. 15/473,996, dated May 17, 2018, Di Pietro et al, "Travel Data Collection and Publication" 28 pages.
Waze, "Get the best route, every day, with real-time help from other drivers"; retrieved on Feb. 3, 2017 at <<https://www.waze.com/>>, Waze Mobile; 3 pages.

\* cited by examiner

TRAVEL DATA COLLECTION AND PUBLICATION

RELATED APPLICATIONS

This application claims priority to and is a continuation of U.S. patent application Ser. No. 15/473,996, filed on Mar. 30, 2017, the entire contents of which are incorporated herein by reference.

BACKGROUND

Vehicular and other transportation methods can be impaired due to various events, such as accidents and traffic. Vehicle operators are often caught unaware of, and thus are affected by, these events. Sometimes, the vehicles controlled by the vehicle operators may further compound the effects of an event. For example, a driver or system operating a vehicle may not be aware of an accident on a roadway. The driver or system may operate the vehicle on the roadway, and may be slowed down or stopped, thereby adding to the congestion caused by the accident.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
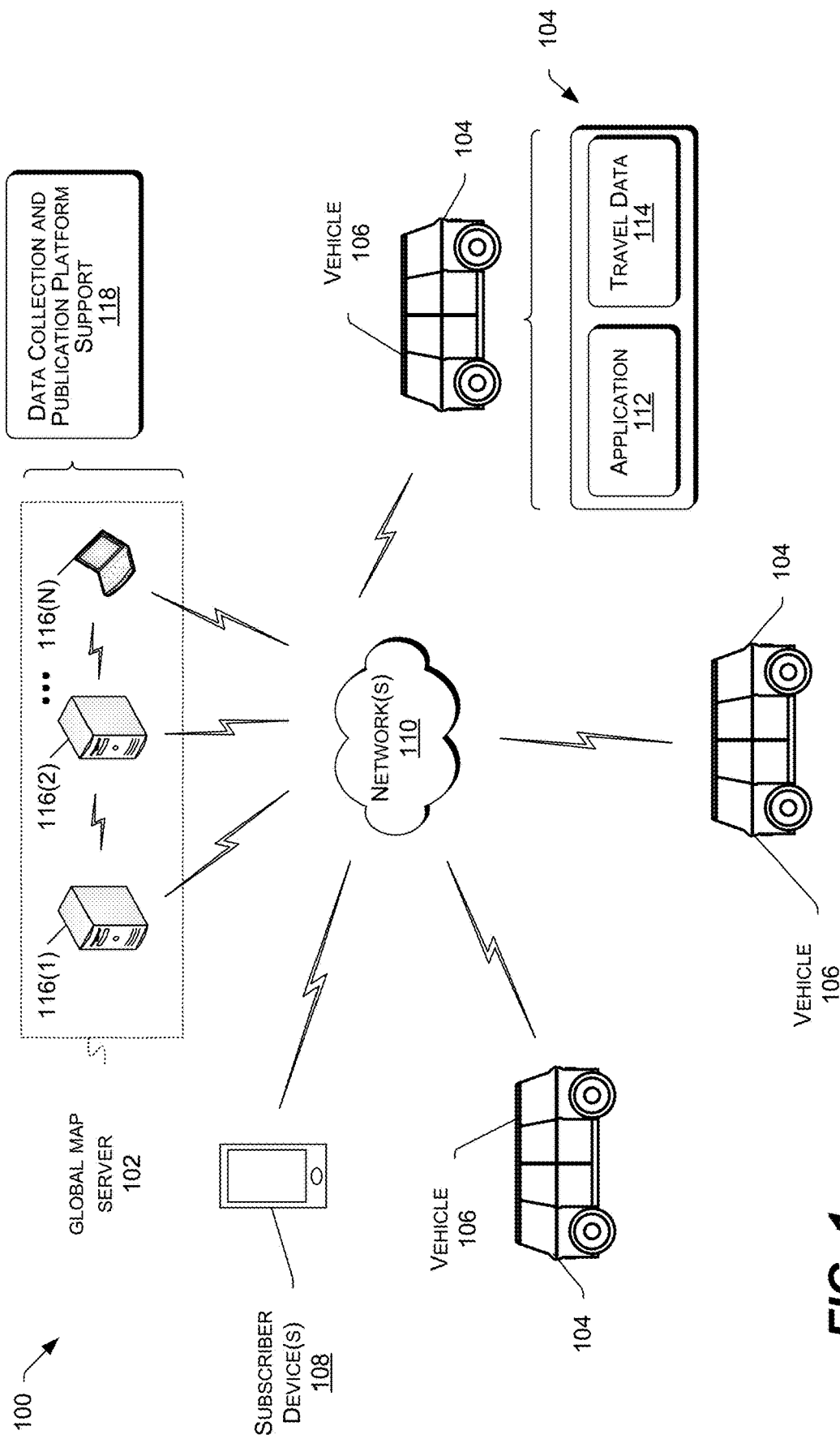
FIG. 1 is an example travel data collection and publication system.

Generally, as more data is available, better decisions can be made. Data which can help inform a commuter during his or her route may be, for example, locations of regions having higher traffic than normal, types of weather along a route, and locations of events, parking, and speed traps, to name a few. As an example, vehicle operators may be caught unaware of events that may impair travel in an operating environment. This disclosure is generally directed to techniques and devices for gathering real-time travel data gathered along a route, and publishing travel data for use by various entities (e.g., vehicle operators, law enforcement, transportation services, etc.). Travel data may include, for example, information about areas of interest, such as locations of gas stations, restaurants, rest stops, and hotels (e.g., information regarding quality and price), as well as information about events. An event may include an accident (e.g., car, train, bus, motorcycle), a construction zone, a chemical and/or fuel spill, a first response vehicle (e.g., ambulance, police car, fire truck, etc.), a road block (e.g., felled tree, police cordon, etc.), fire (e.g., house fire, wildfire, etc.), disabled vehicle, facility lockdown (e.g., active shooter scenario), inclement weather situations (e.g., flooding, road plow, etc.), and/or other events that may affect transit and/or be of interest to the various entities. Additionally, travel data may comprise an indicator of a quality of the information. For example, the travel data may indicate that the travel information was determined by autonomous systems, corroborated by a number of vehicle operators, or the like, so as to indicate that the travel data is reliable.

The data related to travel (e.g., travel data) described herein may be captured by one or more computing devices in an environment and provided to a global map server for consolidation on a global map and for publication. The travel data may include a classification (e.g., accident, construction site, fire, etc.), a description (e.g., size, effect on traffic, etc.), a location (e.g., cross streets, latitude/longitude, grid coordinates, etc.), a time stamp, an orientation and/or location of the sensor that captured the data, and/or other information associated with the event. Additionally, or alternatively, the travel data may include images (e.g., still picture, video, etc.) and/or audio data (e.g., voice data) to aid in description.

In various examples, a computing device configured to capture travel data may comprise a computing device of a vehicle operating in the environment. The vehicle may include one or more sensors, such as image capture devices (e.g., RGB cameras, stereo cameras, depth cameras, etc.), light detection and ranging (LIDAR) sensors, radio detection and ranging (RADAR) sensors, global positioning system (GPS) devices, sound detection and ranging (SONAR) sensors, an ultrasonic transducers, magnetometers, gyroscopes, accelerometers, microphones, motion detectors, and/or other types of sensors for operating and/or controlling the vehicle and/or for travel data collection. The computing device(s) of the vehicle may include an application configured to process sensor input to generate travel data. In various examples, the processing may include identification and/or categorization of an event. After processing the sensor input, the computing device may be configured to send the travel data to the global map server. For example, a camera on a vehicle may capture images in the environment, and may send the images to the computing system. The computing device may detect that the images include two vehicles in proximity to one another, and debris surrounding the vehicles. The computing device may identify that the images include an event and may classify (e.g., categorize) the event as an accident. The computing device may determine the location of the accident, such as a latitude and longitude, and the effect on traffic, such as a two-lane closure for eastbound traffic. The computing device may then send information of the event as travel data (i.e., two-car accident at latitude/longitude, causing two-lane closure) to the global map server for publication.

In some examples, the generation and transmission of the travel data may be performed automatically by the computing device (e.g., autonomous vehicle system). In other examples, a user of a computing device in the environment may input and/or capture travel data, and may send the travel data to the global map server, such as via an application on the computing device. The user may be an occupant of a vehicle, a pedestrian, a cyclist, or other person in the environment. For example, an occupant of an autonomous vehicle may observe the two-car accident in the example above, as the autonomous vehicle passes the scene. The occupant may capture an image of the accident with an image capture device, and may send the image to the global map server with a description of the accident. The global map server may consolidate the travel data provided by the computing system of the vehicle and the user's computing device, and may publish at least a portion of the travel data to a global map.

As discussed above, the global map server may be configured to receive the travel data from a plurality of computing devices, such as a plurality of vehicle computing devices and/or a plurality of user computing devices. The global map server may map the travel data on a global map. In some examples, the global map server may be configured to categorize an event corresponding to the travel data and/or provide a description of the event. In such examples, the categorization and/or description may be generated by the global map server and/or vetted by a human operator. For example, the global map server may receive an image of an event from a computing device of a pedestrian, as well as the location of the computing device. The global map server may analyze the image and determine the event depicted in the image is a car accident. The global map server may associate the image with the identified event (i.e., the car accident), and may map the image to the global map based on the location of the identified event, the location of the computing device and/or the location and/or orientation of the sensors that captured the data associated with the identified event.

In various examples, the global map server may consolidate data associated with a particular event. The consolidation of data may be based on locations and/or timestamps associated with the travel data. For example, the global map server may receive the travel data and location from the pedestrian computing device described above, as well as travel data from one or more vehicles nearby the location. The global map server may determine that the travel data from the pedestrian and the travel data from the vehicles corresponds to the same event, and may consolidate the data on the global map.

In some examples, the global map server may determine a confidence level associated with each event (e.g., high confidence, medium confidence, low confidence, confidence score on a scale of 1-10, probability, etc.). The confidence level can be based on a number of computing devices (of one or more vehicles and/or users) providing information corresponding to the event, a level of confidence provided by the computing device, a validation by a trusted observer (e.g., a subscriber to a global map service, law enforcement, first responder, etc.), an amount of travel data related to a single event, a freshness of the travel data (e.g., time since the travel data was captured), or the like. For example, a vehicle may include sensors, including image capture devices, placed about the vehicle, such as on a front end and a rear end of the vehicle. Cameras on the front end may send images to the computing system as the vehicle approaches an event. The computing system may identify the event and may categorize the event as an accident. The computing system may then receive images of the event from the cameras on the rear end of the vehicle, as the vehicle passes and drives away from the event. By using multiple sets of sensors, the computing system may then confirm the event and/or validate the categorization, indicating a high confidence level of the data. The computing system may then send the travel data with a high confidence level to the global map server. For another example, a law enforcement officer on the scene of an accident may send travel data to the global map server, such as via an application. Based on the travel data input coming from a trusted source, the global map server may rate the event with a high confidence level (e.g., 10 out of 10).

In some examples, the global map server may anonymize the travel data. Anonymizing the data may include removing (e.g., blur, black out, etc.) sensitive data, such as license plate numbers or other identifying information (e.g., faces, distinguishing tattoos, scars, etc.). Additionally, the anonymizing may include removing offensive images from the global map. For example, an image of a motorcycle accident may include an accident victim with a compound fracture. The global map server may blur or otherwise remove the accident victim from the image, to account for viewer sensitivities.

In various examples, the global map server may publish at least a portion of the travel data on a global map (e.g., consolidated map), such as via a website (e.g., a corresponding uniform resource locator), an application, or other means by which viewers may access the travel data. In some examples, the portion may include an icon of an event or area of interest, a location, an effect on traffic, a time the travel data was last received and/or generated, an image, a video, a description of the event, a detour route, a confidence level associated with the travel data, and/or other travel data. In various examples, the global map server may render the travel data and/or the global map data available via an application program interface (API). In such examples, various services and/or individuals may be able to call on the API to access the travel data and/or the global map data.

In various examples, the global map may be viewable to subscribers of a global map service (e.g., an event and/or area of interest mapping service). In such examples, the amount of travel data provided on the global map may be based on a subscription level of a subscriber. For example, a commercial trucking company may subscribe to a platinum membership for travel data. The commercial trucking company may be provided access to a website with a map of icons depicting categories and locations of events, detailed descriptions, effects on traffic, images associated with the events, and suggested detour routes. For another example, a subscriber may purchase a bronze membership for travel data, which includes access to a website with a map of icons depicting the category and/or location of events.

Additionally, a level of anonymity may be based on a subscription level of the subscriber. For example, a police entity may be provided with a subscription with no filtering for anonymity, or a zero level of anonymity. As such, the police accessing a website or an application corresponding to the subscription may be able to view a consolidated map with events and corresponding travel data, including images with license plate numbers, etc. In various examples, a subscription may include a baseline level of anonymity, such as the removal of license plate numbers. In some examples, a subscriber may have a user profile, in which the subscriber may set a level of anonymity. In such examples, the subscriber may determine how much information they would like filtered out of the travel data. For example, a parent may set a level of anonymity to include filtering of the human form out of images associated with events. In such an example, the family viewing images associated with events may not be subjected to potentially gruesome images of victims.

To this end, examples of the present disclosure are related to systems and methods for generating and publishing maps with areas of interest and events, and data associated therewith. To receive timely and accurate data, it can be useful to receive crowd-sourced information. Receiving data from multiple sources increases the likelihood that timely data is received. In addition, obtaining data from multiple sources enables the data to be verified. In other words, two (or three, or more) users or computing devices providing travel data (e.g., image data from one or more cell phone cameras) from a particular location acts to verify the accuracy of the data. In some cases, as discussed below, data from multiple computing devices can be "fused" together to provide more complete and accurate travel data. As such, a system is described that receives travel data from a plurality of computing devices, process the travel data, updates a global map, and publishes at least a portion of the travel data on a global map, for viewing by a user (e.g., subscriber).

As used herein, the term "travel data" means data related to an area of interest or an event in an environment. The travel data may include categorization data, location data (e.g., GPS data, grid coordinates, address, cross-streets), sensor orientation data, description data (e.g., verbal and/or text description), time data, and the like. Additionally, the travel data may include images (e.g., satellite images, street-view images, etc.), videos, and/or auditory descriptions of the event.

As used herein, the term "global map" or "consolidated map" relates to a representation of areas of interest and/or events compiled and/or updated by a global map server using travel data provided by one or more computing devices in an environment, and covering large areas (e.g., city blocks, cities, counties, regions, etc.). By way of example and not limitation, the global map may include topographic maps, street maps, rail maps, weather maps, and/or other types of maps. Additionally, or in the alternative, the global map may be a topological map, a grid map, a relational database, a lookup table, or the like. The global map may include travel data, as described above. Additionally, the global map may include route information (e.g., event detour information, driving directions, etc.), and/or other information related to events.

By way of example and not limitation, the term "computing device," as used herein, includes mobile devices (e.g., smart phones, tablets, laptop computers, GPS devices, etc.), vehicle-based computers (e.g., navigation systems, control systems, entertainment systems, sensor systems, dash cameras, camera arrays, etc.), or other devices capable of collecting and/or relaying travel data, sensor data, or other data for generating a global map. The electronic devices can include components such as, for example, cameras, accelerometers, GPS receivers, cellular and wireless transceivers, magnetometers, altimeters, compasses, gyroscopes, and other equipment, which can be used to compile and send data. The electronic device can also include one or more image capture devices (or cameras) including, but not limited to, low- and high-resolution digital still and video cameras, stereoscopic cameras—which may be capable of providing ranging information—and vehicle camera arrays (e.g., parking cameras) with multiple views.

The systems, methods, and devices described hereinafter as making up the various elements of the present disclosure are intended to be illustrative and not restrictive. Many suitable systems, methods, and configurations that would perform the same or a similar function as the systems described herein, are intended to be included within the scope of the disclosure. Example implementations are provided below with reference to the following figures.

FIG. 1 illustrates a data collection and publication system 100 can be implemented. In some examples, the various devices and/or components of system 100 can include a global map server 102 configured to communicate with one or more computing devices 104, such as those onboard one or more vehicles 106, and subscriber device(s) 108, via one or more networks 110. The computing device(s) 104, may include an application 112 for gathering real-time sensor data and identifying data associated with one or more areas of interest (hotels, gas stations, restaurants, rest areas, etc) or events (e.g., an accident, a construction zone, a chemical and/or fuel spill, a first response vehicle, a fire, a road block, a disabled vehicle, a facility lockdown, inclement weather situations, etc.). In some examples, the computing device(s) 104 may send travel data 114 (e.g., real-time travel data 114) to the global map server 102. In some examples, the computing device(s) 104 may send sensor data (e.g., real-time sensor data) to the global map server 102. The global map server 102 may process the travel data 114 and/or sensor data, and publish a real-time global map comprising the travel data 114, such as to the subscriber device(s) 108 via the network(s) 110. In additional examples, the computing device(s) 104 may process the travel data 114 and/or sensor data and send the processed data to the global map server 102 for incorporation into a global map and real-time publication.

For the purpose of illustration, the vehicles 106 may comprise a fleet (e.g., a platoon) of multiple vehicles 106, each of which being configured to communicate the travel data 114 to the global map server 102. The vehicles 106 may be autonomous vehicles configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In that case, since the vehicles 106 may be configured to control all functions from start to stop, including all parking functions, they may be unoccupied. This is merely an example, and the systems and methods described herein may be incorporated into any ground-borne vehicle, including those ranging from vehicles that need to be manually controlled by a driver at all times, to those that are partially autonomously controlled, such that they can be autonomously controlled without driver attention or assist during certain driving conditions, such as, for example, while operating on limited-access highways, but such that they require driver attention and/or assistance during other driving conditions, such as, for example, while operating on city streets in urban areas, or during at least some parking functions.

The example vehicles 106 shown in FIG. 1 are automobiles having four wheels and respective tires for each of the wheels. Other types and configurations of vehicles are contemplated, such as, for example, vans, motorcycles, sport utility vehicles, cross-over vehicles, trucks, buses, agricultural vehicles, and construction vehicles. The vehicles 106 may be powered by one or more internal combustion engines, one or more electric motors, hydrogen power, any combination thereof, and/or any other suitable power sources. In addition, although the example vehicles 106 have four wheels, the systems and methods described herein may be incorporated into vehicles having fewer or a greater number of wheels, tires, and/or tracks.

In various examples, the computing device 104 may be mounted in, or be a component of, the vehicle 106. The computing device 104 can belong to a variety of categories or classes of devices, such as traditional consumer-type devices, desktop computer-type devices, mobile devices, special purpose-type devices, and/or embedded-type devices. The computing device 104 can include, but is not limited to, a desktop computer, a laptop computer, a thin client, a terminal, or other mobile computer, a computer navigation consumer computing device, a satellite-based navigation system device including a global positioning system (GPS) device, and other satellite-based navigation system device, an action camera, a smartphone, mobile phone, mobile phone-tablet hybrid device, or other telecommunication device worn or carried by a user (e.g., pedestrians, bicyclists, etc.), a tablet computer, or a tablet hybrid computer, an automotive computer such as vehicle control system or vehicle security system, or other computing device configured to participate in and carry out travel data collection as described herein. Regardless of the source or vehicle 106, the multiple computing devices 104 in multiple vehicles 106 can provide "crowd sourced" data that covers broad areas and provides up-to-date data. Additionally, users operating a computing device 104 (e.g., subscriber device 108), such as a cell phone, tablet, action camera, or other device worn or carried by the user, may provide "crowd sourced data" to the global map server 102 to enhance the data collection and publication system.

In some examples, the computing device(s) 104 may receive travel data 114 via a user interface. The user may be an occupant of a vehicle 106 in the fleet, an occupant of non-fleet vehicle, a pedestrian, bicyclist, or other person capable of operating a computing device in the environment. In some examples, the user may identify information regarding an area of interest and/or an event, such as via sensory perception (e.g., visual, audio, etc.), and may manually input travel data 114 into the application 112 of the computing device(s) 104. In some examples, the application 112 may automatically associate a time and a location of the computing device with the travel data 114, and consequently, the event. The computing device(s) 104 may then send the travel data 114 to the global map server 102 for processing and publication.

In various examples, the computing device(s) 104 may receive raw sensor data from one or more sensors on the vehicle 106. In some examples, the one or more sensors may include sensors on the computing device(s) 104 itself. The one or more sensors may include cameras, motion detectors, accelerometers, gyroscopes, magnetometers, wheel encoders, LIDAR sensors, ultrasonic transducers, RADAR sensors, SONAR sensors, GPS transceivers, inertial measurement units (IMUs), microphones, environmental sensors (e.g., ambient temperature gauge, road surface temperature gauge, humidity sensor, and barometric pressure sensor, etc.), and/or other sensors configured to assist in the operation and/or control of the vehicle 106. The computing device(s) 104 may process the raw sensor data, and identify one or more events, such as via the application 112. In some examples, the application 112 may be configured to classify the event. The computing device(s) 104 may then send travel data 114, such as the classification, a location, a time stamp, and a description, to the global map server 102 for processing and publication.

As mentioned above, the computing device(s) 104 may send travel data to the global map server 102 via the network(s) 110. The network(s) 110 can include public networks such as the Internet, private networks such as an institutional and/or personal intranet, or some combination of private and public networks. The network(s) 110 can also include any type of wired and/or wireless network, including but not limited to local area networks (LANs), wide area networks (WANs), near field communication (NFC), satellite networks, cable networks, Wi-Fi networks, WiMax networks, mobile communications networks (e.g., 3G, 4G, and so forth), or any combination thereof. The network(s) 110 can utilize communications protocols, including packet-based and/or datagram-based protocols such as internet protocol (IP), hypertext transfer protocol (HTTP), hypertext transfer protocol secure (HTTPS), transmission control protocol (TCP), user datagram protocol (UDP), or other types of protocols. Moreover, network(s) 110 can also include a number of devices that facilitate network communications and/or form a hardware basis for the networks, such as switches, routers, gateways, access points, firewalls, base stations, repeaters, backbone devices, and the like.

In some examples, the network(s) 110 can further include devices that enable connection to a wireless network, such as a wireless access point (WAP). The examples which support connectivity through WAPs send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

The global map server 102 may include global map server devices 116(1)-116(N). Embodiments support scenarios where global map server device(s) 116 can include one or more computing devices that operate in a cluster or other grouped configuration to share resources, balance load, increase performance, provide fail-over support or redundancy, or for other purposes. Global map server device(s) 116 can belong to a variety of categories or classes of devices such as traditional server-type devices, desktop computer-type devices, mobile devices, special purpose-type devices, and/or embedded-type devices. Thus, although illustrated as desktop and laptop computers global map server device(s) 116 can include a diverse variety of device types and are not limited to a particular type of device. Global map server device(s) 116 can represent, but are not limited to, desktop computers, server computers or blade servers such as web-servers, map-reduce servers, or other computation engines or network-attached storage units, personal computers, mobile computers, laptop computers, tablet computers, or any other sort of computing device. Furthermore, though depicted together in FIG. 1, in some examples, global map server device(s) 116 need not reside in a single location. Each of the global map server device(s) 116 may be connected over a network, such as network 110, so as to reside in separate and distinct locations.

The global map server 102 may be configured to receive and process travel data 114 from the one or more computing device(s) 104. As discussed above, the travel data 114 may include crowd sourced data from multiple computing devices 104. In various examples, the global map server 102 may include a data collection and publication platform support 118 configured to receive and process the travel data 114.

In some examples, the global map server 102 and/or the computing device 104 (whether onboard a vehicle 106 or a subscriber device 108) may be configured to classify an event. In some examples, the global map server 102 and/or the computing device 104 may be configured to perform object recognition (e.g., object detection, feature extraction, feature-model comparison, object classification, verification) on one or more images of the travel data 114. In some examples, the object recognition may include the use of machine learning techniques, such as deep learning, and/or other means by which a computing system may recognize (e.g., identify and classify) objects in an image. In such examples, the global map server 102 may be trained by inputting a dataset associated with expected output values into a neural network. The expected output values, or "ground truth," may include specific objects in an image, as well as a semantic classification or label of the objects (e.g., identifying and labeling an event as an accident). In some examples, the datasets can include one or more images representing real-world scenes and may be annotated by hand or via one or more algorithms to segment, detect, classify, and/or label the objects in the dataset. Based on the object recognition, the global map server 102 may determine that an image includes an event and/or may classify the event in the image. In some examples, the object recognition algorithm may detect various areas of interest and/or may classify the areas of interest. As a non-limiting example, the global map server 102 may classify an object detected as a gas station.

In various examples, the computing device 104 and/or the global map server 102 may be configured to perform text recognition on travel data 114. In some examples, the global map server 102 may perform text recognition on input text and/or images. The input text may comprise a description, a classification, a location, detour information, and/or other information related to the area of interest or event. In various examples, the global map server 102 may perform a semantic analysis on the text input to determine a meaning, content, and/or context of the text input using, for example, natural language processing techniques. In such examples, the classification of the event may be based at least in part on the text input. In some examples, the global map server 102 may perform text recognition on text identified in an image using, for example optical character recognition (OCR). The text may comprise words on a bumper sticker located on a vehicle, a license plate number and issuing authority, or the like. As several additional non-limiting examples, a user may input text via the subscriber device 108 associated with an area of interest, such as "We got a great rate at this hotel" or "This gas station offers free coffee with a fill-up."

Additionally or alternatively, the global map server 102 and/or computing device 104 may be configured to classify the event using audio signals related to the event. In some examples, the audio signals may be uploaded in the travel data 114, such as from one or more microphones on the vehicle 106. In some examples, the global map server 102 and/or the computing device 104 may perform speech recognition (e.g., automatic speech recognition, natural language understanding, etc.) on an audio signal, and may identify a word in the audio signal that corresponds to an event classification. The global map server 102 may thus classify the event accordingly. For example, a passenger of a vehicle 106 may comment on the severity of an accident, or the size of a pothole in the road. A computing device 104 may capture the audio signal and may process the audio signal to determine that it includes the word "crash," or "pothole," as the case may be. The global map server 102 and./or computing device 104 may identify the word and may classify the event corresponding to the travel data 114 as an accident or a pothole, respectively.

In some examples, the global map server 102 and/or computing device 104 may be configured to determine a confidence level (e.g., confidence score) associated with travel data 114 and/or an event and/or an area of interest associated therewith. The confidence level may be based on a number of confirmations (i.e., a number of computing devices 104 that send data related to the event), travel data 114 received from a trusted source (e.g., accident information from law enforcement, department of transportation, a subscriber, etc.), a confidence level calculated by the computing device 104, a confidence in the object, text, and/or audio recognition processing, a freshness of the travel data 114 (e.g., time since the travel data 114 was captured), or the like. In various examples, the global map server 102 may include a minimum (e.g., threshold) confidence level. In various examples, the global map server 102 may deploy a vehicle, such as an autonomous vehicle controlled by the global map server 102, to a location in proximity to the event in order to gather additional travel data 114 and/or confirm the existence of the event. In some examples, the global map server 102 may delay further processing and/or publication of the travel data 114 until the minimum confidence level is achieved. For example, a global map server 102 may receive travel data 114 from an unknown user via a computing device 104. Because the user is unknown, the global map server 102 may assign the travel data 114 a low confidence level, such as a 1 out of 5. The global map server 102 may include a minimum confidence level of 2 out of 5. Based on the confidence level being below the minimum confidence level, the global map server 102 may refrain from further processing and/or publication of the travel data 114. The global map server 102 may then receive other travel data 114 corresponding to the event, such as from a known user or computing device 104 on a vehicle 106. The global map server 102 may process the other travel data 114, and may increase the confidence level associated with the event, such as to a 3 out of 5. Based on the increased confidence level above the minimum confidence level, the global map server 102 may further process and/or publish data related to the event.

In various examples, the global map server 102 may process travel data 114 provided by multiple computing devices 104, and may determine a time and/or quality associated with the travel data 114. In some examples, the global map server 102 may parse the travel data 114 into different types of travel data 114, and may evaluate the time and/or quality associated with each type of travel data 114. The global map server 102 may then filter the travel data 114, and further process and/or publish the most recent and/or highest quality travel data 114. For example, the global map server 102 may receive two images associated with an event from two sources. The first image may be of low quality (e.g., generally blurred image), and the second may be of a higher quality (e.g., generally crisp image). The global map server 102 may determine that the second image is a superior image (e.g., better depiction of the event), and may select the second image for further processing and/or publication. For another example, the global map server 102 may receive travel data 114 related to a particular event from multiple computing devices 104. The global map server 102 may determine a time associated with each travel data 114, and may select the most recent travel data 114 for publication.

In various examples, the global map server 102 and/or the computing device 104 may be configured to anonymize the travel data 114. Anonymizing the data may include filtering (e.g., removing, blurring to render unrecognizable, etc.) sensitive data from the travel data 114. Sensitive data may include data which can be used to identify an individual, such as license plate numbers, bumper stickers, physical characteristics (e.g., a face, a distinctive tattoo, etc.), voices, or other data. Additionally, sensitive data may include offensive language, and/or other undesirable images or audio. In various examples, the global map server 102 and/or computing device 104 may be configured to recognize the sensitive data for anonymity filtering. In some examples, the recognition may be by object, text, and/or speech recognition. In various examples, the global map server 102 may apply machine learning techniques to identify sensitive data in travel data 114. In such examples, the global map server 102 may be trained with a dataset to recognize license plates, names, words, phrases, and/or other sensitive data. Additionally, the anonymizing may include removing offensive images from the travel data 114. For example, an image of a motorcycle accident may include an accident victim with a compound fracture. The global map server 102 and/or computing device 104 may blur or otherwise remove the accident victim from the image, to account for viewer sensitivities.

In various examples, the global map server 102 may be configured to generate a global map including identified events and/or areas of interest and corresponding travel data 114. The global map may include a topographic map, a street map, a rail map, a weather map, and/or another type of map. As non-limiting examples, the global map is one or more of a topological map, a grid map, a relational database, or a lookup table, though any other representation is contemplated. The global map may include icons corresponding to an event, an area of interest, a location, an effect on traffic, a time the travel data was last received (e.g., a timestamp), an image, a video, a description of the event and/or area of interest, a detour route, and/or other travel data 114. In some examples, the global map server 102 may be configured to assign an icon based in part on the classification of the event and/or area of interest. In some examples, the global map server 102 may be configured to determine routing information (e.g., detour information, driving directions, etc.) associated with one or more events. In such examples, the global map may include the routing information.

In various examples, the global map server 102 may publish the global map, such as to a website or an application accessible by one or more subscriber devices 108. In various examples, the information included in the global map may be based on a subscription to a global map service (e.g., a service provided by the global map server 102). In such examples, the subscription may define a level of detail a subscriber may receive on the global map. For example, a subscriber may have a level 1 subscription to the global map service. The level 1 subscription may include event classification (e.g., icon) and location information only. As such, the subscriber access may be limited to a global map with icons in corresponding locations. For another example, a subscriber may have a level 10 subscription to the global map. The level 10 subscription may include event classification, location information, available imagery, effects on traffic, detour routing, and any other available information. The level 10 subscriber may thus have access to a global map with the available travel data and routing information for each event.

In various examples, a subscriber to the global map service may maintain a subscription profile. The subscription profile may include the subscriber information, a subscription level and/or user preferences related to travel data. In some examples, the subscription profile may include a level of anonymity (e.g., an amount of blurred or retracted information) associated with the travel data. In such examples, the level of anonymity may be based on the subscriber information, a subscription level, and/or user preferences. In some examples, a subscription profile may include a zero level of anonymity, in which little to no information may be blurred or removed from images and/or audio recordings (e.g., audio signals). For example, a law enforcement subscription profile may include access to all available travel data with a global map, including sensitive data. In such an example, law enforcement officers may be able to identify vehicles and/or owners/operators, such as during a surveillance and/or if an all-points bulletin (APB) associated with a vehicle and/or the owner and/or operator thereof is issued. Thus, the crowd-sourced real-time data provided in the global map may improve the safety and security of the community.

In some examples, the level of anonymity may include a minimum amount (e.g., a baseline) of anonymity. In such examples, a minimum amount of sensitive or otherwise identifying information may be removed from images and/or audio prior to publication. For example, subscriber accounts with a minimum level of anonymity may include images with blurred license plate numbers. An additional level of anonymity (above the minimum amount) may be determined by a subscription level and/or user preferences. For example, a subscriber may include a user preference to have human forms in an image blurred, and to have audio data filtered out prior to publication. Based on the preferences, the global map server 102 and/or the website or application may filter out data.

In some examples, the global map server 102 may store the subscription profile in a data store of one or more global map server devices 116. In such examples, the global map server 102 may apply the subscription profile, and filter out data unrelated to the level of subscription and/or process data based on user preferences prior to publication.

In some examples, the subscription profile may be stored on a data store of the subscriber device 108. In such examples, an application (e.g., global map viewing application) on the subscriber device 108 may apply the filter to travel data based on a subscription level and/or user preferences associated with the subscriber. The subscriber may thus view travel data 114 corresponding to the subscription level and/or user preferences.

In various examples, the subscription profile may be stored on a data store of a distributed computing platform or other computing device corresponding to a global map website. In such examples, the subscriber may sign into the website via the subscriber device 108, such as with a discrete user name and password, and may access a global map corresponding to the subscription profile.

Figure 2:
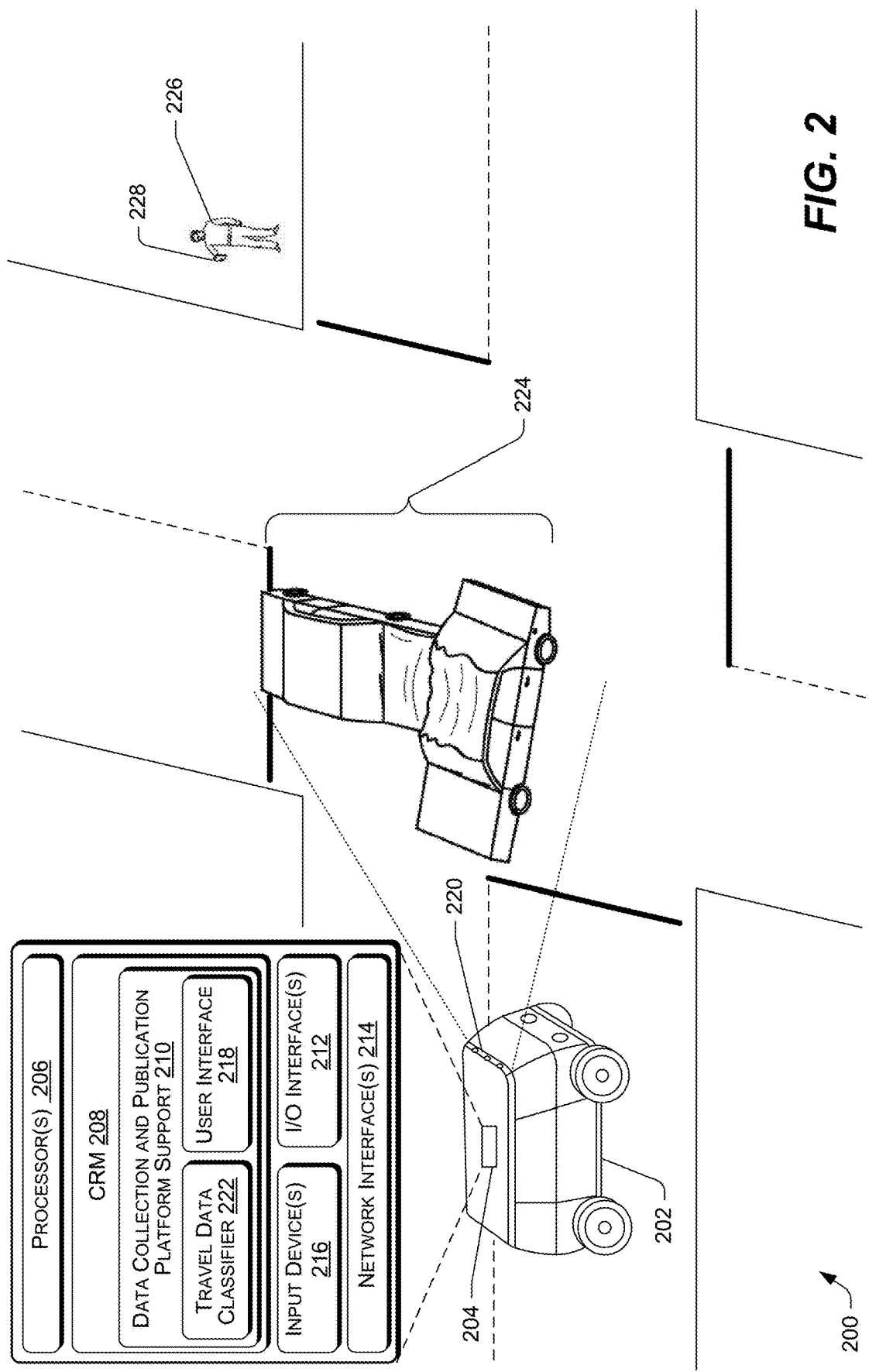
FIG. 2 is an example environment in which a vehicle may collect travel data in a travel data collection and publication system.

FIG. 2 illustrates an example environment 200 in which a vehicle 202 may collect travel data in a travel data collection and publication system. As discussed above, vehicle 202, such as vehicle 106, may include a computing device 204, such as computing device 104, configured to gather real-time sensor data and/or travel data associated with an event.

The computing device 204 on the vehicle 202 may include a computing device having one or more processors 206 operably connected to a non-transitory computer-readable media (CRM) 208, such as via a bus, which in some instances can include one or more of a system bus, a data bus, an address bus, a PCI bus, a Mini-PCI bus, and any variety of local, peripheral, and/or independent buses.

CRM 208 may be configured to store executable instructions/modules, data, and/or data items accessible by the processor(s) 206. In various implementations, the non-transitory CRM 208 may be implemented using any suitable memory technology, such as static random access memory (SRAM), synchronous dynamic random access memory (SDRAM), nonvolatile/Flash-type memory, or any other type of memory. In the illustrated example, program instructions and data implementing desired functions, such as data collection and publication platform support 210, which may comprise a platform support for an application, such as application 112, are shown stored within the non-transitory computer readable memory. In other examples, program instructions, and/or data may be received, sent or stored on different types of computer-accessible media, such as non-transitory media, or on similar media separate from the non-transitory computer readable media. Generally speaking, a non-transitory, CRM 208 may include storage media or memory media, such as flash memory (e.g., solid-state memory), magnetic or optical media (e.g., a disk) coupled to a vehicle operation control system via an input/output (I/O) interface 212. Program instructions and data stored via a non-transitory CRM 208 may be transmitted by transmission media or signals such as electrical, electromagnetic, or digital signals, which may be conveyed via a communication medium such as a network and/or a wireless link, such as may be implemented via one or more network interfaces 214.

The network interface(s) 214 may be configured to enable communications between the computing device 204 of the vehicle 202 and a global map server, such as global map server 102 over a network. Such network interface(s) 214 can include one or more network interface controllers (NICs) or other types of transceiver devices to send and receive communications over a network. In various examples, the network interface(s) 214 can also include a mobile network interface to enable communication between the computing device 204 and the global map server over a mobile communication network connection (e.g., global system for mobile communications network (GSM), code division multiple access (CDMA), etc.). Additionally, or alternatively, the network interface(s) 214 can include one or more proximity interfaces, which can further include hardware and software to communicate via a proximity network, to further enable communications with computing devices of other vehicles 202, such as the fleet of vehicles depicted in FIG. 1. The proximity network can be peer-to-peer, wireless USB, Bluetooth, IrDA, Z-Wave, body area, or any other wired or wireless path based on the proximity of at least two computing devices. Proximity can be determined by wired connections and/or proximity sensors. In the proximity network, the vehicles 202 can share data between each other via a proximity network.

In one implementation, the I/O interface 212 may be configured to coordinate I/O traffic between the processor(s) 206, the non-transitory CRM 208, and one or more input devices 216, the network interface(s) 214, and/or other peripheral interfaces, such as output devices. In some examples, the I/O interface 212 may perform any necessary protocol, timing or other data transformations to convert data signals from one component (e.g., the non-transitory CRM 208) into a format suitable for use by another component (e.g., processor(s) 206). In some examples, the I/O interface 212 may include support for devices attached through various types of peripheral buses, such as a variant of the Peripheral Component Interconnect (PCI) bus standard or the Universal Serial Bus (USB) standard, for example. In some implementations, the function of the I/O interface 212 may be split into two or more separate components, such as a north bridge and a south bridge, for example. Also, in some implementations, some or all of the functionality of the I/O interface 212, such as an interface to the non-transitory CRM 208, may be incorporated directly into the processor(s).

As discussed above, the computing device 204 may include a data collection and publication platform support 210 configured to receive and process real-time data. In some examples, the data may be input by a user, such as via a user interface 218. For example, an input device 216 of the computing device 204 may include a keyboard (or touch sensor, mouse, etc.) located inside an occupant portion of the vehicle. An occupant of the vehicle 202 may input travel data, such as a description of an accident 224, via the input device 216. The travel data may subsequently be processed by the data collection and publication platform support 210.

In various examples, the data may include raw sensor data from one or more sensors 220 on the vehicle 202. The sensor(s) 220 may include cameras, LIDAR sensors, RADAR sensors, (GPS) devices, IMUs, gyroscopes, accelerometers, magnetometers, microphones, weather sensors, and/or other types of sensors for operating and/or controlling the vehicle and/or for travel data collection. In some examples, the raw sensor data may be data collected by the computing device 204 to assist in the operation and/or control of the vehicle 202.

The sensor(s) 220 may capture data in a field of view of the sensors. Though illustrated as having a field of view in a front end of the vehicle 202, the one or more sensors may include a field of view at a rear end of the vehicle, at the sides of the vehicle 202, on a top and/or bottom portion, inside the vehicle 202, such as in an occupant portion, or any other area of the vehicle on which a sensor 220 may be mounted.

The sensor(s) 220 may capture data, and send the sensor data to the data collection and publication platform support 210 for processing. In some examples, the sensor data may include identifying information about a particular sensor 220 from which the data was captured (e.g., a frame rate, intrinsics, etc.), a time of capture, or the like. In some examples, the data collection and publication platform support 210 may include a travel data classifier 222 configured to process the sensor data and identify one or more events. In various examples, the sensor data may include one or more images captured by a camera, such as images of the accident 224. In such examples, the travel data classifier 222 may perform object recognition (e.g., object detection, feature extraction, feature-model comparison, object classification, verification) on the one or more images. Based on the object recognition, the travel data classifier 222 may determine that an image includes an event and/or area of interest. Additionally, the travel data classifier 222 may be configured to assign a classifier to the event and/or area of interest based on one or more objects recognized in the image. For example, an image depicting the accident 224 in FIG. 2, may be determined to be an event and classified as a two-car accident.

In various examples, the travel data classifier 222 may be configured to confirm and/or verify the event and/or classification thereof. In some examples, travel data classifier 222 may perform object recognition on images from multiple cameras. In such examples, the computing device 204 may confirm that the event exists (i.e., not detected based on erroneous input from one camera), and may verify the initial classification of the event. For example, a camera mounted on a front end of a vehicle 202 may capture a first set of images. The camera may send the first set of images to a computing device 204 on the vehicle 202. A travel data classifier 222 of the computing device 204 may perform object recognition on the first set of images and may determine that the first set of images includes an event, such as the accident 224. As the vehicle 202 passes the accident 224, a camera mounted on a rear end of the vehicle 202 may capture a second set of images of the accident 224, and may send the second set of images to the computing device 204. The travel data classifier 222 may perform object recognition on the second set of images, and may determine that the second set of images also include the accident 224. The travel data classifier 222 may then confirm the event and classification thereof.

In some examples, the travel data classifier 222 may be configured to identify and/or classify an event and/or area of interest based on a semantic scene parsing. In such examples, the travel data classifier 222 may process sensor data, sensor position data, sensor orientation data, and/or object data, such as that determined using object recognition on the images to segment objects from an image and/or provide a context for such objects. In various examples, based at least in part on the segmented object and/or context, the travel data classifier 222 may determine a classification of an event. The travel data classifier 222 may include a library of contexts (e.g., words or phrases describing events) and/or relationships between object classifications and contexts for use in determining the event classification.

The travel data classifier 222 may compare the input data and/or high-level description of the event to the event description listing to determine a classification (e.g., semantic meaning or description) of the event. Accordingly, the sensor data, sensor position data, sensor orientation data, and/or object data may be mapped to a corresponding event description in the event description listing to identify a corresponding semantic label, classification, or description of the event. As a non-limiting example, the semantic scene parsing may segment two vehicles from an image of a camera sensor and provide the context that a first vehicle is colliding with a second vehicle. In such an example, the travel data classifier may determine that there is an event and the event is classified as an accident.

In various examples, the travel data classifier 222 may apply machine learning techniques to determine whether the image includes an event. In such examples, the travel data classifier 222 may be trained by inputting a dataset associated with expected output values into one or more networks, such as convolutional neural networks or support vector machines. The expected output values may include specific objects in an image, sizes and shapes thereof, as well as a semantic classification or label of the objects (e.g., identifying and labeling an event as an accident). In some examples, the machine learning algorithms may additionally output a confidence level in the identification and/or classification of the event. In some examples, the datasets can include one or more images representing real-world scenes and may be annotated by hand or via one or more algorithms to segment, detect, classify, and/or label the objects in the dataset. In examples using machine learning techniques, the travel data classifier 222 may be able to quickly and accurately identify and classify an event and/or area of interest. Additionally, based on feedback or input from other computing devices and/or occupants of the vehicle 202, the machine learning algorithms may be continually updated and/or verified.

In various examples, the travel data classifier 222 may be configured to perform text recognition on travel data. In some examples, the travel data classifier 222 may perform text recognition on input text. The input text may comprise a description, a classification, a location, detour information, and/or other information related to the event. In various examples, the travel data classifier 222 may perform a semantic analysis on the text input (e.g., using natural language processing) to determine a meaning, content, and/or context of the text input. In such examples, the classification of the event may be based at least in part on the text input. In some examples, the travel data classifier 222 may perform text recognition on text identified in an image. The text may comprise words on a bumper sticker located on a vehicle, a license plate number and issuing authority, or the like.

In some examples, the travel data classifier 222 may receive audio signals (e.g., audio input) from one or more microphones and may employ speech recognition techniques for classifying and/or confirming a classification of an observed event. The one or more microphones may be mounted to an external surface of the vehicle 202 or an internal surface, such as in an occupant portion of the vehicle 202. In some examples, the travel data classifier 222 may be configured to initially identify an event and/or area of interest using the sensor(s) 220, and may determine that an occupant is present in the occupant portion of the vehicle 202. Based on a determination of the occupant in the vehicle 202, the travel data classifier 222 may cause one or more questions to be asked to the occupant, such as via a speaker in the occupant portion. The travel data classifier 222 may then process the responses using speech recognition, and may classify the event (or area of interest) and/or validate a classification (e.g., assign a higher confidence level in the classification) based in part on the responses. For example, a camera on the front end of the vehicle 202 may observe the accident 224. The travel data classifier 222 may ask an occupant how many cars are involved. Based on a response that two cars are involved in the accident 224, the travel data classifier 222 may validate a classification as a two-car collision. In some examples, the travel data classifier 222 may provide the global map server with the questions and responses as a portion of the travel data.

The speech recognition may include automatic speech recognition, natural language processing, or other type of speech recognition technology. In some examples, the travel data classifier 222 may be configured to associate the audio signal with an identified (e.g., observed) event, such as that identified based on one or more received images, and store the audio signal as travel data. For example, an occupant of the vehicle 202 may observe the accident 224 and exclaim "wow, did you see that crash?" Responsive to recognizing the word "crash," the travel data classifier 222 may classify and/or confirm an event observed by one or more other sensors 220 as an accident. For another example, the computing device 204 may receive audio signal corresponding to a first responder vehicle siren from one or more microphones. Based on the siren detection, the computing device 204 may identify that there is an event nearby a location of the vehicle 202. In some examples, the audio signal may be used by the travel data classifier 222 and/or the data collection and publication platform support 210 as a confirmation or and/or to assign an increased confidence level to the identification and/or classification of the event.

In various examples, the data collection and publication platform support 210 and/or the travel data classifier 222 may assign an initial confidence level to an identification and/or classification of an event. The initial confidence level may be based on a success of object recognition, an output of a machine learning algorithm, a validation of the event by a secondary input (e.g., two or more sensors providing input indicating an event), or the like. For example, a camera on the vehicle 202 may send images of the accident 224 to the computing device 204. Based on a recognition of objects in the images substantially matching known objects, the travel data classifier 222 can assign a medium confidence level (e.g., 5 out of 10) to the classification as an accident. Additionally, the computing device 204 may receive audio input describing the event as an accident. The additional audio input may be processed by the travel data classifier 222, and the travel data classifier 222 may increase the confidence level, such as to a 7 out of 10, based on the confirmation.

In various examples, the computing device 204 may determine a location of a detected event. The computing device 204 may determine the location by inputting a location of the computing device 204 and/or the vehicle 202 and sensor data from a distance and/or direction sensor, such as a LIDAR sensor, on the vehicle 202. In some examples, the location of the computing device 204 and/or the vehicle 202 may be determined by triangulating signals received from cell towers. In various examples, the location of the computing device 204 and/or the vehicle 202 may be determined based on data received from a GPS receiver, an IMU, and/or other navigation sensor on the vehicle 202. For example, a GPS receiver may determine a latitude and longitude of the vehicle 202, and a LIDAR sensor may determine a distance and direction from the vehicle 202 to the event. The computing device 204 may use the location of the vehicle 202 and the distance and direction (e.g., bearing) to the event to determine a latitude and longitude of the event.

In various examples, the travel data classifier 222 may compile data associated with an event, such as the accident 224, from the sensor(s) 220 and/or input device(s) 216. The data collection and publication platform support 210 may then send the travel data associated with the accident 224 to the global map server via the network interface(s) 214 for processing and publication on a real-time global map. In some examples, the travel data classifier 222 may send an identifier associated with the vehicle 202, the computing device 204, and/or the sensor(s) 220 used to capture the travel data. In such examples, the global map server may identify the source of the travel data, such as for a confidence level determination. In some examples, responsive to receiving the travel data from the computing device 204, the global map server may automatically map the event and/or travel data on a global map and publish the global map. In such examples, the computing device 204 may cause the global map server to publish at least a portion of the global map and/or information derived (e.g., derived data) from the global map.

Additionally or alternatively, an observer 226 of the accident 224 may send travel data (e.g., real-time travel data) to the global map server for processing and publication. In the illustrative example, the observer 226 may send the travel data via a user computing device 228 (e.g., computing device 104 from FIG. 1). In some examples, the user computing device 228 may include an application (e.g., application 112) or a data collection and publication platform support (e.g., data collection and publication platform support 210) for inputting and uploading travel data to the global map server.

The observer 226 may observe the accident 224, and may input travel data into the user computing device 228. The travel data may include a classification as a two-car accident, a location of the user computing device 228, an address nearby the accident 224, cross-streets associated with the accident 224, text, and/or audio description of the accident 224 (e.g., injury accident, lanes of traffic blocked, etc.), an image associated with the accident 224, or any other information that may be beneficial to the public.

Similar to computing device 204, the user computing device 228 may upload the travel data to the global map server for processing and publication on a real-time global map. In some examples, responsive to receipt of second travel data associated with the accident 224, the global map server may validate an existence of the accident and/or assign a higher confidence level to the travel data received from the computing device 204 of the vehicle 202. Additionally, the global map server may combine travel data from the computing device 204 and the user computing device 228, and publish the combined travel data with the global map. For example, the global map server may use location and classification data from the travel data provided by computing device 204, and images and descriptions from the travel data provided by the user computing device 228.

In some examples, responsive to receiving the travel data from the computing device 228, the global map server may automatically incorporate the travel data into a global map and publish at least a portion of the global map and/or information derived from the global map. In such examples, the computing device 228 may cause the global map server to publish the requested data.

Figure 3:
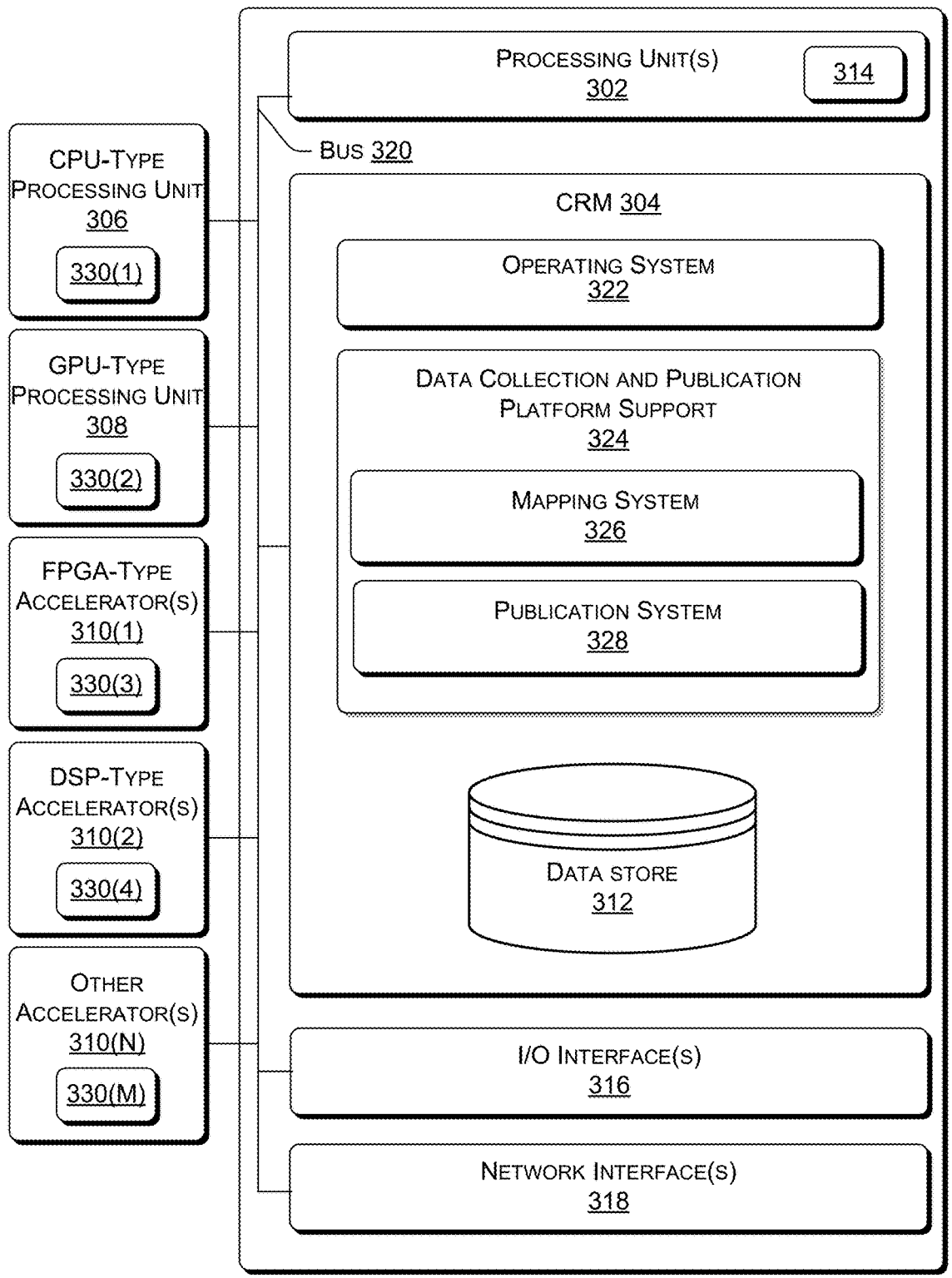
FIG. 3 is a block diagram that illustrates select components of an example global map server device used for travel data collection and publication.

FIG. 3 illustrates an example computing device 300 configured with a travel data collection and publication system, such as global map server device 116 from FIG. 1 or computing device 204 from FIG. 2. In computing device 300, processing unit(s) 302 can represent, for example, one or more of a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc.

In some examples, computing device 300 can be one of a plurality of devices, such as global map server devices 116(1), 116(2), and 116(N), which are part of a distributed service platform (e.g. the Cloud). In some examples, computing device 300 can be one of a plurality of devices which are capable of connection via a proximity network. In various examples, computing device 300 can be one of a plurality of devices which are both part of a distributed service platform and capable of connection via a proximity network.

In some examples, CRM 304 may store instructions executable by the processing unit(s) 302, which as discussed above, can represent a processing unit incorporated in computing device 300. CRM 304 can also store instructions executable by external processing units such as by an external CPU-type processing unit 306, an external GPU-type processing unit 308, and/or executable by an external accelerator 310, such as an FPGA-type accelerator 310(1), a DSP-type accelerator 310(2), or any other accelerator 310(N). In various examples, at least one CPU-type processing unit, GPU-type processing unit, and/or accelerator is incorporated in computing device 300, while in some examples one or more of a CPU-type processing unit, GPU-type processing unit, and/or accelerator is external to computing device 300.

In the illustrated example, CRM 304 also includes a data store 312. In some examples, data store 312 includes data storage such as a database, data warehouse, or other type of structured or unstructured data storage. In some examples, data store 312 can include a corpus and/or a relational database with one or more tables, indices, stored procedures, and so forth to enable data access including one or more of hypertext markup language (HTML) tables, resource description framework (RDF) tables, web ontology language (OWL) tables, and/or extensible markup language (XML) tables, for example. Data store 312 can store data for the operations of processes, applications, components, and/or modules stored in CRM 304 and/or executed by processing unit(s) 302. Additionally, the data store 312 can store travel data, such as in an event description listing, which may include a library of event descriptions written using the Semantic Description Language. Alternately, some or all of the above-referenced data and/or instructions can be stored on separate memories 314 on board one or more processing unit(s) 302, CPU-type processing unit 306, GPU-type processing unit 308 and/or accelerator(s) 310. For example, the data store 312 may store subscriber profiles for one or more subscribers of a travel data mapping service.

Computing device 300 can further include one or more input/output (I/O) interfaces 316 to allow computing device 300 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like). In addition, in computing device 300, network interface(s) 318 can represent, for example, network interface controllers (NICs) or other types of transceiver devices to send and receive communications over a network, such as network 104.

In the illustrated example, computing device 300 can operably connect the processing unit(s) 302 to CRM 304, I/O interface(s) 316, and network interface(s) 318 via a bus 320. In some examples, bus 320 can include one or more of a system bus, a data bus, an address bus, a PCI bus, a Mini-PCI bus, and any variety of local, peripheral, and/or independent buses.

In the illustrated example, CRM 304 also includes an operating system 322, which can be any type of operating system, such as MICROSOFT WINDOWS, WINDOWS, QNX™, IBM z/OS™, LINUX, ANDROID, iOS™, OS X™, NETBSD™, or any other operating system capable of managing computer hardware and software resources on computing device 300.

CRM 304 also includes a data collection and publication platform support 324, which can be travel data collection and publication platform support 118, 210. Data collection and publication platform support 324 can include one or more modules and/or APIs, which are illustrated as mapping module 326 and publication module 328, although this is just an example, and the number can vary higher or lower. Functionality described associated with the mapping module 326 and the publication module 328 can be combined to be performed by a fewer number of modules and/or APIs, or it can be split and performed by a larger number of modules and/or APIs.

In various examples, the mapping module 326 may be configured to receive travel data (e.g., real-time travel data) from one or more computing devices, such as computing devices 104, 116, 204. Such travel data may comprise an event and/or an area of interest. As an example, an event may include an accident (e.g., car, train, bus, motorcycle), a construction zone, a chemical and/or fuel spill, a first response vehicle (e.g., ambulance, police car, fire truck, etc.), a road block (e.g., felled tree, police cordon, etc.), fire (e.g., house fire, wildfire, etc.), disabled vehicle, facility lockdown (e.g., active shooter scenario), inclement weather situations (e.g., flooding, road plow, etc.), and/or other events that may affect transit. An area of interest may include a hotel, a gas station, a rest stop, etc. The travel data may include a classification (e.g., accident, construction site, fire, etc.), a description (e.g., size, effect on traffic, etc.), a location (e.g., cross streets, latitude/longitude, etc.), a time stamp, an orientation and/or location of the sensor that captured the data, and/or other information associated with the event. Additionally or alternatively, the travel data may include images (e.g., still picture, video, etc.) and/or voice data describing the event. In some examples, the travel data may include sensor data, such as from one or more sensors of a vehicle.

In various examples, the mapping module 326 may be configured to analyze travel data to determine a classification of the travel data. In such examples, the mapping module 326 may perform object, text, and/or speech recognition on the travel data in addition to, or in lieu of object and/or speech recognition performed by the computing device providing the travel data. In some examples, the mapping module 326 may employ a semantic scene parsing to define various entities and actions in the travel data. In such examples, the scene parsing may provide a high-level description of the event which may be used to identify and/or classify an event. In some examples, the mapping module 326 may analyze an event description listing (e.g., library of event descriptions) to determine a classification of an event. In such examples, the mapping module 326 may compare input travel data, such as sensor data, sensor position data, sensor orientation data and/or object data, and may map the input sensor data to a corresponding event description in the event description listing to identify a corresponding semantic label, classification, and/or description of the event. In various examples, the mapping module 326 may apply machine learning techniques to the travel data to identify and/or classify events. In such examples, the mapping module 326 may be trained to identify and/or classify events in received travel data, such as by training a neural network with a dataset including multiple events and associated classifications.

As discussed above, data associated with an event may be crowd sourced, or provided by multiple computing devices. As such, the mapping module 326 may be configured to process travel data from multiple sources, and group the travel data from multiple sources by event and/or area of interest. The mapping module 326 may group the travel data based on a location of the event (or area of interest) and/or a description of the event (or area of interest). Additionally, the mapping module 326 may be configured to select travel data associated with each event (or area of interest) for publication (e.g., travel data to send to the publication module). In some examples, the mapping module 326 may select the travel data for publication based on a time associated with a collection of the travel data. In such examples, the mapping module 326 may evaluate a timestamp or other timing information associated with travel data, and may rank received travel data by the time collected.

Additionally or alternatively, the mapping module 326 may select travel data for publication based on a quality of the travel data. In various examples, the mapping module 326 may evaluate a quality of travel data associated with each event and/or area of interest, and may rank the travel data based on the quality. In such examples, the selection may be based on the ranking (e.g., highest ranking travel data per event and/or area of interest). In some examples, the quality may be determined by an analysis of sensor data (e.g., an image and/or audio signal), such as if an image is blurred or the audio signal includes a lot of background noise. In some examples, the quality may be determined based on a confidence level associated with the travel data, as calculated by the computing device 204.

In various examples, the mapping module 326 may be configured to parse and/or combine travel data from various sources for publication. In such examples, the parsing and/or mapping may be performed to provide the most up to date, high quality travel data for publication. For example, the mapping module 326 may receive travel data associated with an event from three sources. The first travel data may include a location and a blurred image, the second travel data may include a location and an audio description, and the third travel data may include a location and a crisp image. The mapping module 326 may select the location data from the first travel data, the audio description from the second travel data, and the crisp image from the third travel data, and send the combined travel data to the publication module 328 for publishing.

In some examples, the mapping module 326 may be configured to determine a confidence level (i.e., global confidence level) of the received travel data. In such examples, the global confidence level may be based on a number of computing devices providing information corresponding to the event, a level of confidence provided by the computing device, a validation or input by a trusted observer (e.g., a subscriber to an event and/or area of interest mapping service, law enforcement, first responder, etc.), an amount of travel data related to a single event, or the like. In various examples, a particular source (e.g., computing device) may be recognized by the mapping module 326 as providing better or more trusted data than other sources. For example, the better or more trusted data may be based on technical capabilities (e.g., higher resolution sensors) and/or a historical accuracy (e.g., 97% of the captured data from the device is accurately classified) of the particular source. In various examples, the mapping module 326 may select travel data for publication based in part on the confidence level of the travel data. In some examples, the mapping module 326 may include a minimum confidence level (i.e., threshold confidence) to apply to travel data in order for the travel data to be selected for publication. For example, the mapping module 326 may have a minimum confidence level of 5 out of 10. The mapping module 326 may receive travel data from an unknown source, and may assign an initial confidence level (e.g., 2 out of 10) to the travel data. The mapping module 326 may not select the travel data for publication until additional travel data associated with the event is received, and the confidence level increases above the minimum confidence level.

In various examples, the mapping module 326 may send the selected travel data to the publication module 328, for publication. In some examples, the mapping module 326 may be configured to update the travel data for publication. The mapping module 326 may send updated information to the publication module continuously, as new travel data is received from various computing devices, and/or it may send updated information on a fixed time interval, such as every 5 minutes, 10 minutes, 15 minutes, or the like. In some examples, a fixed time interval may be based on an event classification. For example, travel data associated with a construction zone may be updated hourly and travel data associated with an accident may be updated more often, such as every minute.

In various examples, the publication module 328 may receive selected travel data from the mapping module 326. In some examples, the publication module 328 may anonymize the travel data prior to publication. Anonymizing the data may include filtering (e.g., removing) sensitive data from the travel data. Sensitive data may include data which can be used to identify an individual, such as license plate numbers, bumper stickers, physical characteristics (e.g., black out faces, blur faces, etc.), voices, or other data. Additionally, sensitive data may include offensive language, and/or other undesirable images or audio. For example, an image of a motorcycle accident may include an accident victim with a compound fracture. The publication module 328 may blur or otherwise remove the accident victim from the image, to account for viewer sensitivities.

In various examples, the publication module 328 may be configured to recognize the sensitive data for anonymity filtering. In some examples, the recognition may be based on object, text, and/or speech recognition performed by the mapping module 326. For example, objects in an image may be labeled or otherwise recognized, such as by a bounding box of a particular size and/or shape. For another example, offensive language in a bumper sticker captured in an image may be identified during text recognition, and filtered out by the publication module 328.

In various examples, the publication module 328 may anonymize the data to a baseline (e.g., minimum) level of anonymity. In such examples, the publication module 328 may remove and/or blur one or more types of sensitive data recognized in travel data. For example, the publication module 328 may remove and/or blur license plates from images associated with an event. In some examples, the publication module 328 may anonymize the data based on a subscription to a global map service. For example, a law enforcement subscription may include a low (e.g., a 1) or zero level of anonymity. A law enforcement officer may thus be able to view sensitive data in images. For another example, a delivery company may have a higher level of anonymity (e.g., 2 or 3), such as that associated with no license plates or other identifying information.

In some examples, the publication module 328 may have access to a subscriber profile, such as that stored in a data store 312 or other internal and/or external storage of the computing device 300. The subscriber profile may include subscription data (e.g., subscription level, user preferences, and/or other data associated with the subscription). In some examples, the publication module 328 may evaluate the subscription data and may anonymize the data based on the subscriber profile.

Figure 4:
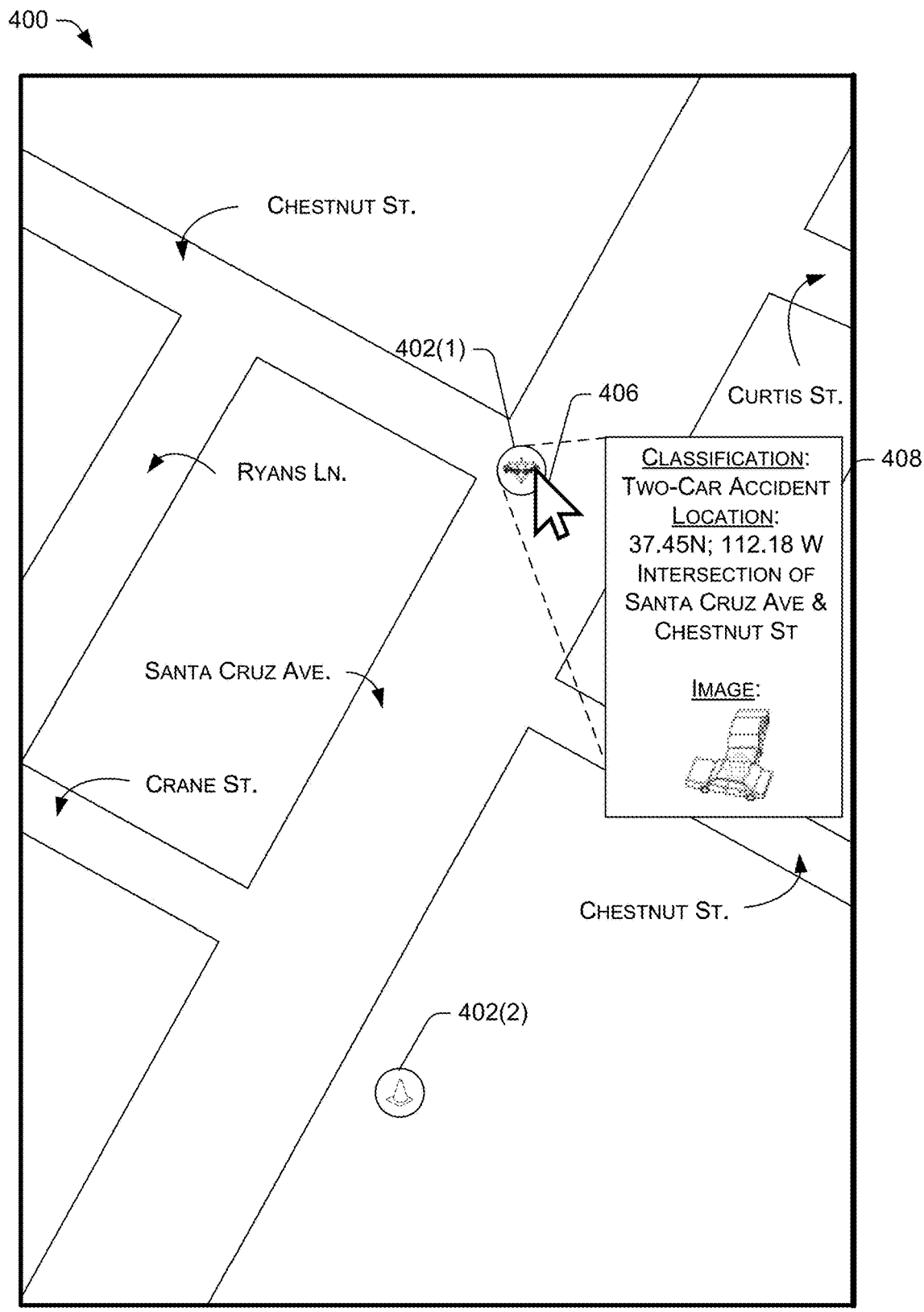
FIG. 4 is an example global map generated in a travel data collection and publication system.

In various examples, the publication module 328 may publish a global map, such as that depicted in FIG. 4, for access by a viewer. In some examples, the publication module 328 may publish at least a portion of, or information derived from, the global map to a website and/or an application. Such a publication may comprise providing an application programmer interface (API), or otherwise, to publish such data upon request. The global map may include a topographic map, a street map, a rail map, a weather map, and/or another type of map. In some examples, the global map may be a topological map, a grid map, or some other representation of the data. In some examples, the global map may include events mapped based on a corresponding location, and associate various icons with the map. Additionally, the global map may include travel data corresponding to areas of interest and/or events, such as a time, an image, a video, a description, a detour route, an effect on traffic, or the like. In some examples, the amount and/or type of travel data published on a global map may be based on a subscription and/or a subscriber profile. The subscription and/or subscriber profile may be identified based on a user identification and/or password, a computing device, an application, or the like, which is used for accessing the published map. For example, a subscriber may sign into a website used for global map publication. The publication module 328 and/or the computing device controlling the website may identify the subscriber profile associated with the subscriber as a baseline subscription that includes a global map with events mapped in the responding locations. The publication module 328 may thus make available a global map with the event icons in the corresponding locations.

As discussed above, the publication module 328 may receive updated travel data from the mapping module 326. The publication module 328 may continuously and/or periodically update the published travel data with up to date travel data. To this end, the computing device 300 may provide an up-to-date global map with events and relevant travel data (e.g., relevant data), to viewers (e.g., subscribers to a global map service).

Additionally, some or all of the above-referenced data can be stored on separate memories 330, such as memory 330(1) on board a CPU-type processing unit 306, memory 330(2) on board a GPU-type processing unit 308, memory 330(3) on board an FPGA-type accelerator 310(1), memory 330(4) on board a DSP-type accelerator 310(2), and or memory 330(M) on board another accelerator 310(N).

FIG. 4 illustrates an example visualization 400 of information published by a global map server, such as global map server 102. The visualization 400 may include real-time travel data associated with one or more events. In some examples, the global map server may publish the information via a website and/or an application for view by various entities. In one or more examples, the information may be published upon request via an application programmer interface (API). In some examples, the various entities may include subscribers to a global map service.

The visualization 400 may include one or more icons 402 corresponding to one or more events and/or areas of interest. In various examples, the global map server may assign an icon to an identified event based on a classification of the event. In such examples, the icon may depict the classification of the event. In the illustrative example, the visualization includes two icons, icon 402(1) depicting an accident, and icon 402(2), depicting a construction zone. In other examples, the icons may include a generic icon. In some examples, a classification of the event may be available responsive to a selection of the icon 402.

In various examples, the icons may be selectable, such as via a cursor 406. The cursor 406 may correspond to a touch input on a touch screen, a mouse input, a keyboard input, a voice input, or other means by which a viewer may select an icon 402, such as via a user interface of the website and/or application to which the visualization 400 is published. In some examples, real-time travel data 408 may be accessible on the visualization 400 by selection of an icon 402. The selection may include a click, a mouse over, a touch, a verbal instruction to display travel data 408, or the like.

In the illustrative example, the icon 402(1) depicts a two-car accident. Responsive to selection of the icon 402(1) by the cursor 406, the travel data 408 may populate on the visualization 400. As illustrated, the travel data 408 may include a classification of the event, a location of the event, and an image of the event. In other examples, the travel data 408 may include a greater or lesser amount of data associated with the event. In some examples, the amount and/or type of data provided to a viewer may be based on a subscription profile and/or a subscription level of the viewer to a global map service.

Figure 5:
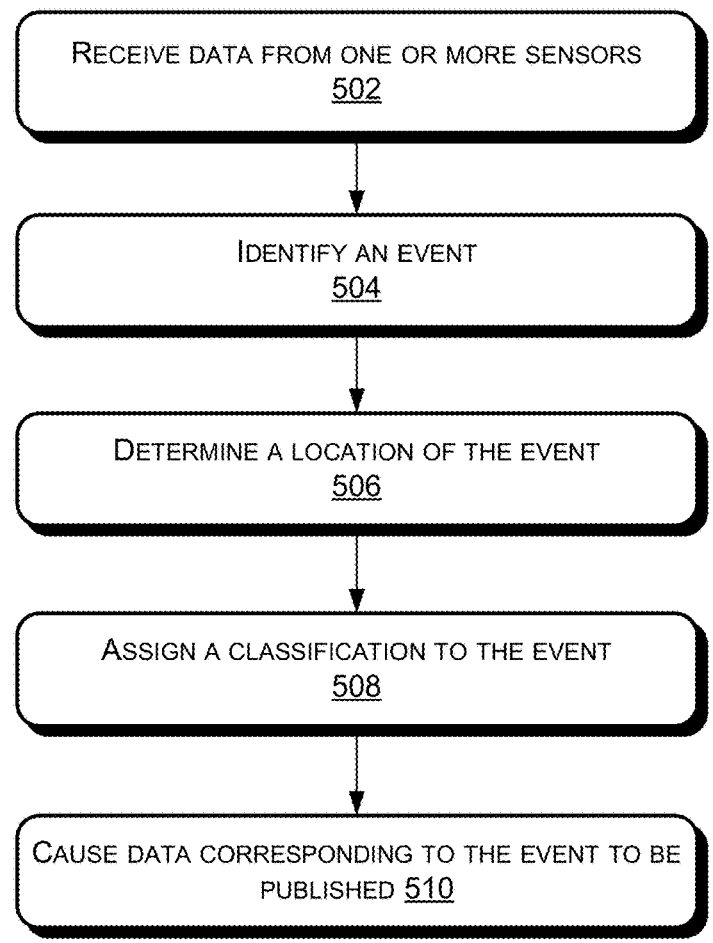
FIG. 5 is a flow diagram of an illustrative process for gathering and publishing travel data.
Figure 6:
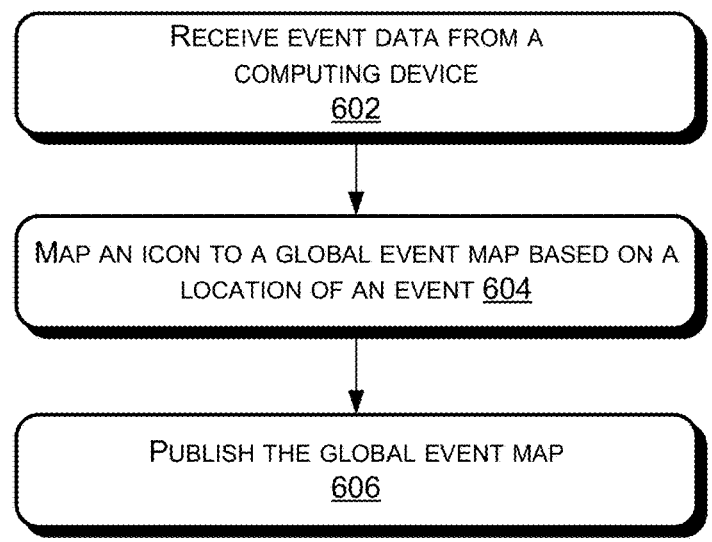
FIG. 6 is a flow diagram of another illustrative process for gathering and publishing travel data.
Figure 7:
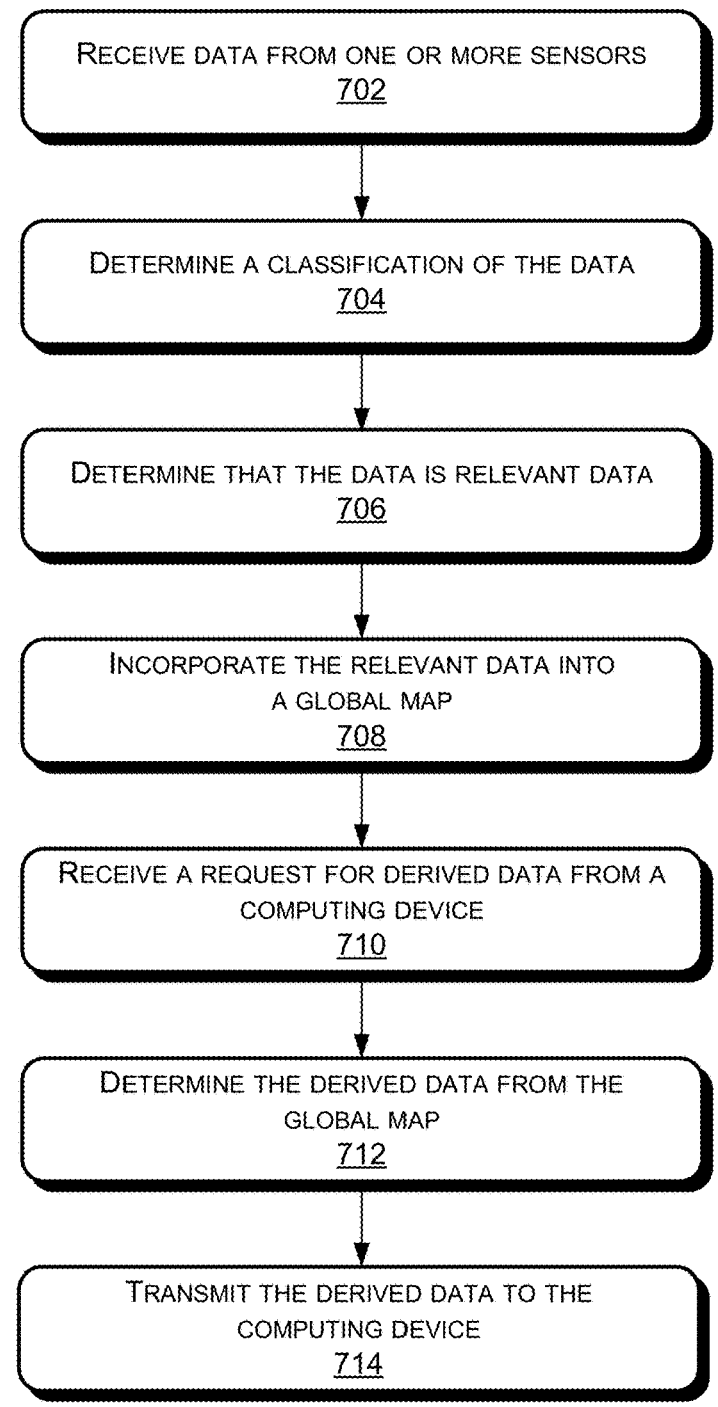
FIG. 7 is a flow diagram of yet another illustrative process for gathering and publishing travel data.

FIGS. 5-7 are flow diagrams of example processes 500, 600, and 700 illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 5 is a flow diagram of an illustrative process 500 for gathering and publishing travel data. In various examples, the process 500 may be performed by a computing device, such as a vehicle computing device (e.g., computing device 104, 204), a user computing device (e.g., subscriber device 108, user computing device 228), and/or a global map server device (e.g., global map server device 300).

At 502, the computing device receives data from one or more sensors. The one or more sensors may include cameras, LIDAR sensors, RADAR sensors, (GPS) devices, IMUs, gyroscopes, accelerometers, magnetometers, microphones, weather sensors, and/or other types of sensors for operating and/or controlling a vehicle and/or for travel data collection. Additionally, or in the alternative, the sensor input may comprise text entered via an input device.

At 504, the computing device identifies an area of interest and/or event based on the data. In various examples, the computing device may identify the area of interest and/or event using object, text, and/or speech recognition technologies on the data. In various examples, the computing device may use machine learning algorithms to identify the event. In such examples, the sensor data may be input into a neural network trained to identify events based on objects recognized in images and/or words describing the event.

At 506, the computing device may determine a location of the event. In some examples, the computing device may determine the location by receiving an indication of a location of the computing device and data from a distance and/or direction sensor, such as a LIDAR sensor. In some examples, the location of the computing device may be determined by triangulating signals received from cell towers. In various examples, the location of the computing device may be determined (e.g., calculated) based on data received from a GPS receiver, during localization (e.g., performing simultaneous localization and mapping (SLAM)), an IMU, and/or other navigation sensor on the vehicle 204. For example, a GPS receiver may determine a latitude and longitude of the computing device, and a LIDAR sensor may determine a distance and direction (e.g., bearing) from the computing device, or a vehicle associated therewith, to the event. The computing system may use the location of the computing device and the distance and direction to the area of interest and/or event to calculate a corresponding latitude and longitude.

At 508, the computing device may assign a classification to the event and/or area of interest. The classification may include an accident (e.g., car, train, bus, motorcycle), a construction zone, a chemical and/or fuel spill, a first response vehicle (e.g., ambulance, police car, fire truck, etc.), a road block (e.g., felled tree, police cordon, etc.), fire (e.g., house fire, wildfire, etc.), disabled vehicle, facility lockdown (e.g., active shooter scenario), inclement weather situations (e.g., flooding, road plow, etc.), and/or other events that may affect transit and/or be of interest to a global map service subscriber. In those examples where an area of interest is assigned a classification, such classification may comprise, for example, a hotel, a gas station, a rest stop, or otherwise, though any other classification is contemplated. In various examples, the computing device may assign a classification to the area of interest and/or event using object, text, and/or speech recognition on the data. In such examples, the classification may be based on an object in an image in the data and/or a word and/or a phrase in the data. Additionally or alternatively, the computing device may use machine learning algorithms to determine a classification to assign to the event.

In various examples, the computing device may assign a confidence level to the classification. The confidence level may be based on a success of object recognition, a validation by a secondary input (e.g., two or more sensors providing input indicating an event), or the like. For example, a camera on a vehicle may send images of an accident to the computing device. Based on a recognition of objects in the images substantially matching known objects, the computing device can assign a medium confidence level (e.g., 5 out of 10) to the classification as an accident. Additionally, the computing device may receive audio input describing the event as an accident. The additional audio input may be processed by the computing device, and the computing device may increase the confidence level, such as to a 7 out of 10, based on the confirmation.

At 510, the computing device may cause the data corresponding to the event (e.g., travel data) to be published. In various examples, the computing device may incorporate travel data into a global map, and may publish the global map via a website and/or application (e.g. via an application programmer interface, API). In some examples, the computing device may send the travel data to a global map server. In such examples, responsive to receiving the travel data, the global map server may incorporate the travel data into a global map and publish the global map via a website and/or an application. In various examples, an amount of travel data published may be based on a subscription and/or subscriber profile of a subscriber to a global map service.

FIG. 6 is a flow diagram of an illustrative process 600 for gathering and publishing travel data. In various examples, the process 600 may be performed by a global map server device, such as global map server device 300.

At 602, the computing device may receive travel data from a computing device. The travel data may include a classification (e.g., accident, construction site, fire, etc.), a description (e.g., size, effect on traffic, etc.), a location (e.g., cross streets, latitude/longitude, grid coordinates, etc.), a time stamp, an orientation and/or location of the sensor that captured the data, and/or other information associated with the event. In some examples, such a classification may be determined by one or more of the computing device or the global map server. Additionally, or alternatively, the travel data may include images (e.g., still picture, video, etc.) and/or voice data describing the event. The travel data may include text, images, and/or audio signals corresponding to the event. In some examples, the travel data may include sensor data generated by one or more sensors of a vehicle. In such examples, the computing device may be configured to process the sensor data to identify and/or classify an event.

In various examples, the computing device and/or the global map server may determine a confidence level associated with the travel data (e.g., high confidence, medium confidence, low confidence, confidence score on a scale of 1-10, etc.). The confidence level may be based on a number of computing devices providing information corresponding to the event, a level of confidence provided by the computing device, a validation by a trusted observer (e.g., a subscriber to an event and/or area of interest mapping service, law enforcement, first responder, etc.), an amount of travel data related to a single event, or the like. In some examples, particular sources may be recognized by the computing device as providing better or more trusted data than other sources. For example, the better or more trusted data may be based on technical capabilities (e.g., higher resolution sensors) and/or a historical accuracy (e.g., 97% of the captured data from the device is accurately classified) of the source.

In some examples, the computing device may receive travel data from a plurality of computing devices. In such examples, the travel data may be crowd sourced. The computing device may be configured to filter the travel data from the plurality of computing devices, and associate the travel data with respective events. Additionally, the computing device and/or the global map server may parse and/or combine travel data corresponding to an event from multiple sources. For example, a first computing device may send a classification and a location of an event to the computing device (e.g., the global map server) and a second computing device may send an image and a location of the event. The computing device (e.g. the global map server) may combine the travel data from the first computing device and the second computing device, and associated the combined travel data with the event.

At 604, the computing device may associate an icon corresponding to the area of interest and/or event with a global map based on a location. In some examples, the location may be determined based on a location of the computing device and/or a distance and direction from the computing device to the event. In various examples, the computing device may first assign the icon based on a classification and/or other travel data.

In various examples, the computing device may determine a route of travel to avoid the event (e.g., detour route). In such examples, the computing device may associate the detour route with other travel data (e.g., classification, location, etc.) for publication.

In some examples, the computing device may be configured to anonymize the travel data. Anonymizing the data may include filtering (e.g., removing) sensitive data from the travel data. Sensitive data may include data which can be used to identify an individual, such as a license plate number, a license plate issuing authority, a bumper sticker, a physical characteristic (e.g., a face, a distinctive tattoo, etc.), a human form, a name, a voice, or other data. Additionally, sensitive data may include offensive language, and/or other undesirable images or audio.

In various examples, the computing device may be configured to recognize the sensitive data for anonymity filtering. In some examples, the recognition may be by object, text, and/or speech recognition. In various examples, the computing device may apply machine learning techniques to identify sensitive data. In such examples, the computing device may be trained with a dataset to recognize license plates, names, words, phrases, and/or other sensitive data. Additionally, the anonymizing may include removing offensive images from the travel data. In some examples, the anonymized data (e.g., text, image, audio) may be associated with the icon for publishing therewith.

At 606, the computing device may publish at least a portion of, or information derived from, the global map. In some examples, the computing device may publish the global map to a website and/or application accessible to a global map service subscriber. In various examples, the computing device may publish at least a portion of the travel data and/or the combined travel data with the global map. In some examples, the computing device may filter travel data and/or combined travel data prior to publication based on a subscription (e.g., a subscription level) and/or subscriber profile. In such examples, the computing device may remove applicable travel data from the global map based on the subscription and/or subscriber profile. For example, a top-level subscription may include any available travel data as well as detour routing information, and a bottom-level subscription may include only an icon corresponding to a classification of the event, and a location associated with the event.

FIG. 7 is a flow diagram of an illustrative process 700 for gathering and publishing travel data. The process 700 may be performed by a computing device, such as a vehicle computing device (e.g., computing device 104, 204), a user computing device (e.g., subscriber device 108, user computing device 228), and/or a global map server device (e.g., global map server device 300).

At 702, the computing device receives data from one or more sensors. The one or more sensors may include image capture devices (e.g., cameras), LIDAR sensors, RADAR sensors, SONAR sensors, ultrasonic transducers, GPS receivers, IMUs, gyroscopes, accelerometers, magnetometers, microphones, weather sensors, and/or other types of sensors for operating and/or controlling a vehicle and/or for travel data collection. Additionally, or in the alternative, the sensor input may comprise text entered via an input device.

At 704, the computing device may determine a classification of the data. The computing device may apply machine learning, object recognition, semantic scene parsing, speech recognition, and/or other techniques to determine the classification of the data. In various examples, the computing device may identify the data as corresponding to an event or an area of interest. In some examples, the identification as corresponding to the event or the area of interest may be based at least in part on the classification of the data.

In various examples, the computing device may determine a confidence level associated with the classification. In some examples, the confidence level may be determined as an output of a machine learning algorithm. In some examples, the confidence level may be determined based on result of one or more of object recognition of an image input, speech recognition of an audio input, and/or semantic scene parsing.

In various examples, the computing device may determine a location of an event and/or area of interest associated with the data. In various examples, the location may be based on a data received from a location sensor associated with the computing device. In some examples, the location may be determined based on distance and/or bearing information to the event and/or area of interest from a sensor capturing the distance and/or bearing information. For example, the computing device may include a computing device associated with a vehicle. The computing device may receive a vehicle location from a location sensor of the vehicle. The computing device may also receive a distance and a bearing from the vehicle to the event and/or area of interest, such as from a LIDAR sensor. The computing device may then calculate the location of the event and/or area of interest based on the vehicle location, the distance, and the bearing to the event and or area of interest.

In some examples, the location may be further based on a location of the sensor on the vehicle with respect to the vehicle location and/or the location of the computing device of the vehicle. In such examples, the computing device may include the location of the sensor in a calculation of the location of the event and/or area of interest.

At 706, the computing devices determines that the data is relevant data. In various examples, the data may be determined to be relevant based on the classification of the data. In some examples, the data may be determined to be relevant based on an association of the data with an event or an area of interest. The relevant data may include data associated with an event or an area of interest, such as a location, an effect on traffic, a time the travel data was last received (e.g., a timestamp), an image, a video, a description of the event and/or area of interest, a detour route, and/or other travel data.

At 708, the computing device incorporates the relevant data into a global map. The global map may include a topographic map, a street map, a rail map, a weather map, and/or another type of map. As non-limiting examples, the global map is one or more of a topological map, a grid map, a relational database, or a lookup table, though any other representation is contemplated. The global map may include icons corresponding to an event or an area of interest, or other relevant data determined at 706. In some examples, the computing device may be configured to determine routing information (e.g., detour information, driving directions, etc.) associated with one or more events. In such examples, the global map may include the routing information.

At 710, the computing device receives a request for derived data from a requesting computing device. The second computing device may include a subscriber device, such as subscriber device 108, a global map service (e.g., an event and/or area of interest mapping service) computing device, or the like.

At 712, the computing device determines derived data from the global map. The derived data may include at least a portion of the relevant data incorporated into the global map. In some examples, the derived data may include relevant data from an area associated with the requesting computing device. Additionally or in the alternative, the derived data may be based on a subscription level and/or subscription preferences of a subscriber to an event and/or area of interest mapping service. For example, the derived data for a subscriber with a premium subscription may include any available relevant data for a particular area, whereas the derived data for a subscriber with a baseline subscription may include a classification and a location associated with events in the area.

At 714, the computing device may transmit the derived data to the requesting computing device. In some examples, the transmission may include a publication to a website and/or application accessible to a subscriber.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

Based on the foregoing, it should be appreciated that technologies for travel data collection and publication have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the subject matter recited in the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

What is claimed is:

1. A system comprising:
   one or more processors; and
   one or more non-transitory computer readable media storing computer-executable instructions that, when executed by the one or more processors, cause the system to perform operations comprising:
      receiving travel data from a first vehicle, wherein the travel data is associated with an event;
      determining a classification for the event;
      associating the travel data and the classification with an area of a map based at least in part on a location of the event;
      determining derived information from the map, the derived information being associated with the area and including a detour route to avoid the event located at the location;
      receiving a request from a second vehicle for the derived information, the request being associated with a subscription level;
      determining that the subscription level is associated with access to the derived information; and
      transmitting, based at least in part on the subscription level, the derived information to the second vehicle, wherein the derived information, after being received by the second vehicle, configures the second vehicle to be controlled or deployed according to the detour route to avoid the event.

2. The system of claim 1, wherein the event comprises one or more of:
   an accident,
   a construction zone,
   a chemical spill,
   a first response vehicle,
   a road block,
   a fire,
   a disabled vehicle, or
   inclement weather situations.

3. The system of claim 1, wherein the travel data is first travel data, the operations further comprising:
   receiving second travel data from an occupant of the first vehicle; and
   associating the second travel data with the event;
   wherein determining the classification is based at least in part on the first travel data and the second travel data.

4. The system of claim 1, the operations further comprising:
   assigning a confidence level to the travel data; and
   determining that the confidence level is above a threshold confidence level;
   wherein associating the travel data with the map is based at least in part on the confidence level being above the threshold confidence level.

5. The system of claim 1, wherein the travel data is first travel data received at a first time, the operations further comprising:
   receiving second travel data from a computing device at a second time;
   associating the second travel data with the event;
   associating the second travel data with the map;
   determining, based at least in part on a difference between the first travel data and the second travel data, updated derived information from the map; and
   publishing the updated derived information.

6. A method comprising:
   receiving travel data from a vehicle computing device, wherein the travel data is associated with an event located in an area of a map;
   determining a classification for the event;
   associating one or more of the travel data or the classification with the map;
   determining, based at least in part on the event and the map, derived information comprising a detour route to avoid the event;
   receiving, from an additional computing device associated with a subscriber, a request for the derived information;
   determining a subscription level associated with the subscriber;
   determining that the subscription level is associated with access to the derived information; and
   transmitting, as a response, the derived information based at least in part on the subscription level associated with the subscriber,
   wherein the response is configured to cause the additional computing device to be controlled or deployed according to the detour route to avoid the event.

7. The method of claim 6, further comprising:
   assigning a confidence level to the travel data; and
   determining that the confidence level is above a threshold confidence level,
   wherein associating the travel data with the map is based at least in part on the confidence level being above the threshold confidence level.

8. The method of claim 7, wherein the confidence level is determined as an output of a machine learning algorithm.

9. The method of claim 7, wherein assigning the confidence level to the travel data is based at least in part on at least one of (i) the vehicle computing device from which the travel data is received, or (ii) a number of devices from which the travel data is received.

10. The method of claim 6, wherein the travel data comprises at least one of an image or audio and wherein determining the classification for the event is further based at least in part on at least one of:

object recognition of the image;
text recognition of the image; or
signal processing of the audio.

11. The method of claim 6, further comprising:
determining that the travel data includes sensitive data; and
removing the sensitive data from the travel data to generate updated travel data,
wherein associating the travel data with the map comprises associating the updated travel data with the map.

12. The method of claim 6, wherein the travel data is first travel data, the method further comprising:
receiving second travel data from a second computing device associated with an observer of the event,
wherein determining the classification is based at least in part on the first travel data and the second travel data.

13. The method of claim 6, wherein the classification for the event is determined using semantic scene parsing.

14. The method of claim 6, wherein the travel data is first travel data received at a first time, the method further comprising:
receiving second travel data from a computing device at a second time;
associating the second travel data with the event;
associating the second travel data with the map;
determining updated derived information from the map; and
transmitting the updated derived information.

15. A non-transitory computer-readable medium storing instructions that, when executed, cause one or more processors to perform operations comprising:
receiving, from a sensor of a first system, data associated with an event;
determining a classification for the event;
assigning a confidence level to the data based at least in part on at least one of (i) the first system from which the data is received, or (ii) a number of devices from which the data is received;
associating the data and the classification with a map based at least in part on the confidence level being above a threshold confidence level;
determining derived data based at least in part on the map, the derived data including a detour route to avoid the event; and
transmitting the derived data to a second system,
wherein receiving derived data causes the second system to be configured to be controlled or deployed according to the detour route.

16. The non-transitory computer-readable medium of claim 15, wherein determining the classification for the event is based at least in part on at least one of:
semantic scene parsing;
object recognition;
text recognition; or
audio signal processing.

17. The non-transitory computer-readable medium of claim 15, the operations further comprising:
receiving a request from a subscriber to access the derived data;
determining a subscription level associated with the subscriber;
determining that the subscription level is associated with access to the derived data; and
granting the subscriber access to the derived data.

18. The non-transitory computer-readable medium of claim 15, the operations further comprising:
determining that the data comprises sensitive data;
receiving a request from a subscriber to access the derived data;
determining a subscription level associated with the subscriber;
removing, based at least in part on the subscription level, the sensitive data from the data to generate anonymized data; and
providing the anonymized data to the subscriber.

19. The non-transitory computer-readable medium of claim 15, the operations further comprising:
determining that the data includes sensitive data; and
removing the sensitive data from the data to generate updated data,
wherein associating the data with into the map comprises associating the updated data with the map.

20. The non-transitory computer-readable medium of claim 15, wherein the data is first data received at a first time, the operations further comprising:
receiving second data from a third system at a second time;
associating the second data with the event;
associating the second data with the map; and
determining updated derived information from the map.

* * * * *